(12) United States Patent
Kanai

(10) Patent No.: US 9,440,470 B2
(45) Date of Patent: Sep. 13, 2016

(54) PRINTING APPARATUS AND PRINTING METHOD

(71) Applicant: Seiko Epson Corporation, Tokyo (JP)

(72) Inventor: Masashi Kanai, Azumino (JP)

(73) Assignee: Seiko Epson Corporation (JP)

(*) Notice: Subject to any disclaimer, the term of this patent is extended or adjusted under 35 U.S.C. 154(b) by 0 days.

(21) Appl. No.: 14/341,244

(22) Filed: Jul. 25, 2014

(65) Prior Publication Data

US 2014/0333689 A1 Nov. 13, 2014

Related U.S. Application Data

(63) Continuation of application No. 13/681,742, filed on Nov. 20, 2012, now Pat. No. 8,820,882.

(30) Foreign Application Priority Data

Nov. 21, 2011 (JP) ................. 2011-253727

(51) Int. Cl.
| | | |
|---|---|---|
| B41J 29/393 | (2006.01) | |
| B41J 2/125 | (2006.01) | |
| B41J 11/00 | (2006.01) | |
| H04N 1/60 | (2006.01) | |

(52) U.S. Cl.
CPC ............ B41J 29/393 (2013.01); B41J 2/125 (2013.01); B41J 11/009 (2013.01); H04N 1/6097 (2013.01)

(58) Field of Classification Search
CPC ...... B41J 11/009; B41J 2/125; B41J 29/393; H01N 1/6097
USPC .......................................................... 347/19
See application file for complete search history.

(56) References Cited

U.S. PATENT DOCUMENTS

| | | | |
|---|---|---|---|
| 6,125,986 A | * | 10/2000 | Nagase .................... 194/207 |
| 2003/0132366 A1 | * | 7/2003 | Gao et al. ................ 250/208.1 |
| 2003/0193034 A1 | | 10/2003 | Tullis et al. |
| 2004/0184646 A1 | * | 9/2004 | Oosawa ..................... 382/128 |
| 2006/0070928 A1 | | 4/2006 | Lovhaugen et al. |
| 2010/0295242 A1 | | 11/2010 | Nireki |

FOREIGN PATENT DOCUMENTS

| | | |
|---|---|---|
| JP | 2000-113271 A | 4/2000 |
| JP | 2005-515068 A | 5/2005 |
| JP | 2006-058261 A | 3/2006 |
| JP | 2008-299639 A | 12/2008 |
| JP | 2009-157504 A | 7/2009 |
| JP | 2009-176142 A | 8/2009 |
| JP | 2011-093183 A | 5/2011 |
| JP | 2011-103088 A | 5/2011 |
| JP | 2011-133956 A | 7/2011 |

\* cited by examiner

*Primary Examiner* — Stephen Meier
*Assistant Examiner* — Alexander D Shenderov
(74) *Attorney, Agent, or Firm* — Harness, Dickey & Pierce, P.L.C.

(57) ABSTRACT

A printing apparatus measures spectral intensity of a printed medium before an image is printed thereon, and calculates Mahalanobis distances with respect to plural types of reference printing media stored in advance. Then, the type of the printed medium is determined from the reference printing media based on the Mahalanobis distances and the image is printed thereon.

7 Claims, 12 Drawing Sheets

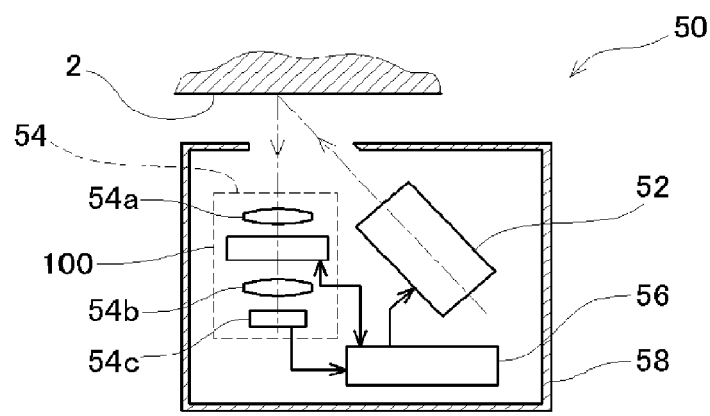
FIG. 2
FIG. 3A
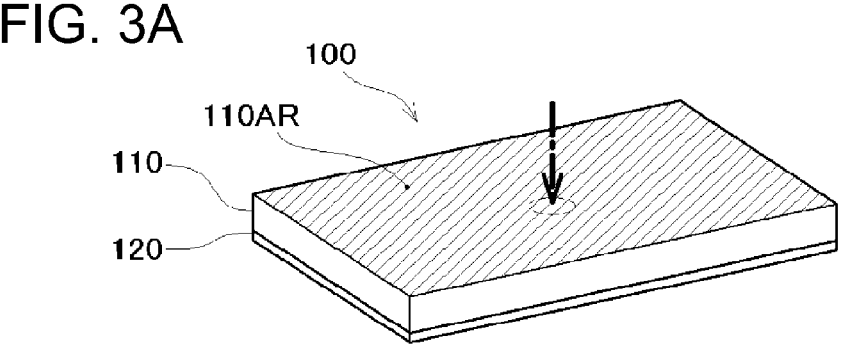
FIG. 3B
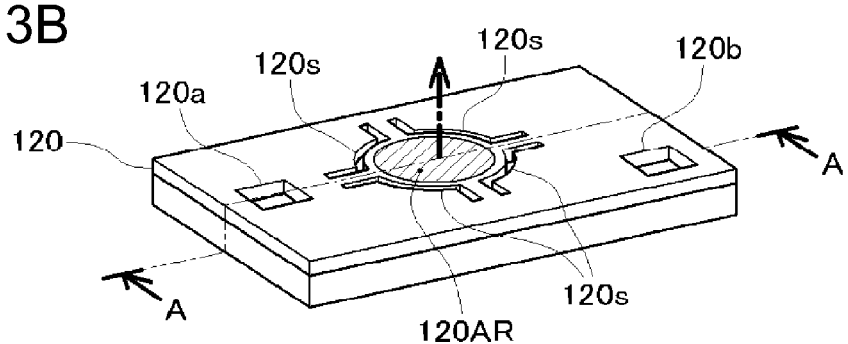

FIG. 7A
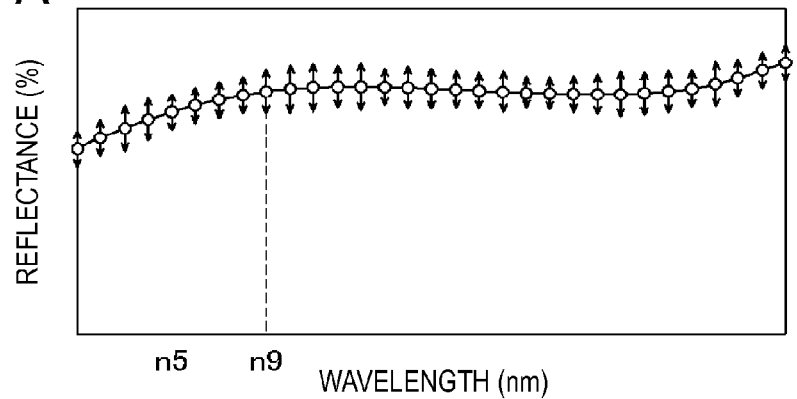
FIG. 7B
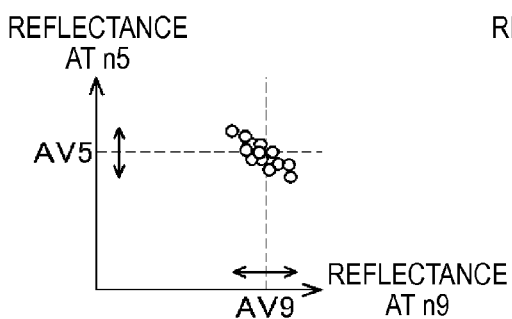
FIG. 7C
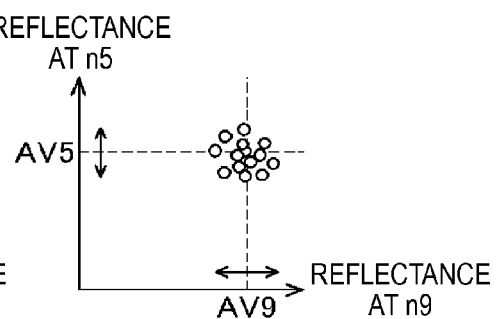
FIG. 7D
$$s59 = \sum (n5-AV5)(n9-AV9)/N$$
FIG. 7E
$$R = \begin{pmatrix} s11 & s12 & s13 & s14 & s15 & s16 & \cdots & s1n \\ s21 & s22 & s23 & s24 & s25 & s26 & \cdots & s2n \\ s31 & s32 & s33 & s34 & s35 & & & s3n \\ s41 & s42 & s43 & s44 & s45 & & & s4n \\ s51 & s52 & s53 & s54 & s55 & & & s5n \\ s61 & s62 & & & & \ddots & & \vdots \\ \vdots & \vdots & & & & & & \vdots \\ sn1 & sn2 & sn3 & sn4 & sn5 & \cdots & & snn \end{pmatrix}$$

FIG.11A
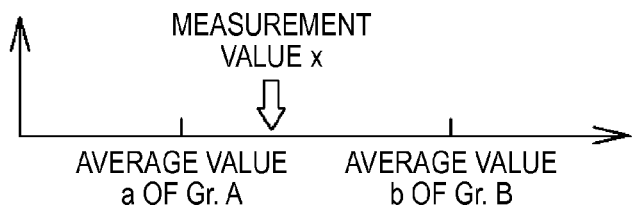
FIG.11B
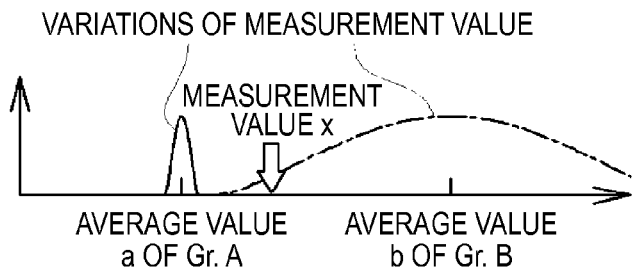
FIG.11C
$$D = \sqrt{\frac{(x-av)^2}{s}} = \sqrt{(x-av)\frac{1}{s}(x-av)}$$
FIG.11D
$$D = \sqrt{(x1-av1, x2-av2)\begin{bmatrix} s11 & s12 \\ s21 & s22 \end{bmatrix}^{-1}(x1-av1, x2-av2)^T}$$
FIG.11E
$$D = \sqrt{X R^{-1} X^T}$$

|  | SPECIMEN 1 | SPECIMEN 2 | SPECIMEN 3 | SPECIMEN 4 | SPECIMEN 5 | SPECIMEN 6 |
|---|---|---|---|---|---|---|
| SAMPLE A | 1 | 41 | 36 | 13 | 20 | 69 |
| SAMPLE B | 24 | 1 | 5 | 93 | 26 | 79 |
| SAMPLE C | 24 | 6 | 1 | 92 | 26 | 78 |
| SAMPLE D | 11 | 53 | 50 | 1 | 20 | 79 |
| SAMPLE E | 31 | 98 | 89 | 73 | 1 | 82 |
| SAMPLE F | 90 | 90 | 97 | 99 | 36 | 1 |

FIG.12

|  | COLOR CONVERSION TABLE |
|---|---|
| SAMPLE A | COLOR CONVERSION TABLE A |
| SAMPLE B | COLOR CONVERSION TABLE B |
| SAMPLE C | COLOR CONVERSION TABLE C |
| SAMPLE D | COLOR CONVERSION TABLE D |
| SAMPLE E | COLOR CONVERSION TABLE E |
| SAMPLE F | COLOR CONVERSION TABLE F |

FIG.13

$$R = \begin{pmatrix} s11 & s12 & s13 & s14 & s15 & s16 & \cdots & s1n \\ s21 & s22 & s23 & s24 & s25 & s26 & \cdots & s2n \\ s31 & s32 & s33 & s34 & s35 & & & s3n \\ s41 & s42 & s43 & s44 & s45 & & & s4n \\ s51 & s52 & & & & \ddots & & \vdots \\ \vdots & \vdots & & & & & \ddots & \vdots \\ \vdots & \vdots & & & & & & \vdots \\ sn1 & sn2 & sn3 & sn4 & sn5 & \cdots & \cdots & snn \end{pmatrix}$$

$$= \lambda 1 \begin{pmatrix} u11 \\ u21 \\ u31 \\ u41 \\ \vdots \\ un1 \end{pmatrix} \begin{pmatrix} u11 \\ u21 \\ u31 \\ u41 \\ \vdots \\ un1 \end{pmatrix}^T + \lambda 2 \begin{pmatrix} u12 \\ u22 \\ u32 \\ u42 \\ \vdots \\ un2 \end{pmatrix} \begin{pmatrix} u12 \\ u22 \\ u32 \\ u42 \\ \vdots \\ un2 \end{pmatrix}^T + \lambda 3 \begin{pmatrix} u13 \\ u23 \\ u33 \\ u43 \\ \vdots \\ un3 \end{pmatrix} \begin{pmatrix} u13 \\ u23 \\ u33 \\ u43 \\ \vdots \\ un3 \end{pmatrix}^T$$

$$\cdots + \lambda n \begin{pmatrix} u1n \\ u2n \\ u3n \\ u4n \\ \vdots \\ unn \end{pmatrix} \begin{pmatrix} u1n \\ u2n \\ u3n \\ u4n \\ \vdots \\ unn \end{pmatrix}^T$$

$$= \lambda 1 U_1 U_1^T + \lambda 2 U_2 U_2^T + \lambda 3 U_3 U_3^T$$

$$\cdots + \lambda n U_n U_n^T$$

FIG.14

PRINTING APPARATUS AND PRINTING METHOD

CROSS-REFERENCE TO RELATED APPLICATIONS

This is a continuation patent application of U.S. application Ser. No. 13/681,742 filed Nov. 20, 2012, which claims priority to Japanese Patent Application No. 2011-253727 filed on Nov. 21, 2011, all of which are expressly incorporated by reference herein in their entireties.

BACKGROUND

1. Technical Field

The present invention relates to a printing apparatus and a printing method of printing an image on a printing medium.

2. Related Art

Printing apparatuses of printing images by attaching color materials such as inks to surfaces of printing media (for example, printing paper or the like) have been developed and widely used. Further, with the widespread of the printing apparatuses, various types of paper as printing media have been provided. As a result, in the recent printing apparatuses, images can be printed with more preferable image quality by image processing according to the types of printing media.

Here, the types of printing media are typically set for the printing apparatuses before the start of printing by operators of the printing apparatuses, however, technologies that enable the printing apparatuses to automatically discriminate the types of printing media have been developed. For example, in a paper type discrimination device disclosed in JP-A-2006-58261, a technology that enables discrimination of the types of printing media (here, printing paper) by applying light to surfaces of the printing media and detecting intensity of the light transmitted through the printing media or intensity of the light reflected on the surfaces of the printing media has been proposed.

Alternatively, in a printing apparatus disclosed in JP-A-2011-93183, a technology for simply discriminating the types of printing media by detecting drive torque of a paper feed motor that feeds the printing media has been also proposed.

However, with the increasing types of printing media, it has been difficult to discriminate the types of printing media with sufficient accuracy using the above proposed technologies, and a problem of difficulty in appropriate image printing has arisen.

SUMMARY

An advantage of some aspects of the invention is to provide a technology that enables appropriate image printing by discriminating types of printing media with sufficient accuracy.

A printing apparatus according to an aspect of the invention includes an image processing memory unit that stores image processing data that is for performing image processing on image data in response to predetermined plural types of reference printing media, a spectral intensity measurement unit that measures spectral intensity as light intensity at predetermined plural types of measurement wavelengths by applying light to a print medium before an image is printed thereon, an average spectral intensity memory unit that stores average spectral intensity obtained by measuring the spectral intensity at plural times and obtaining average values of the spectral intensity with respect to each measurement wavelength with respect to the plural types of reference printing media, a covariance information memory unit that stores covariance information obtained by measuring the spectral intensity at plural times and obtaining covariances of the spectral intensity among the plural measurement wavelengths with respect to the plural types of reference printing media, a Mahalanobis distance acquisition unit that acquires Mahalanobis distances between the print medium and the plural types of reference printing media based on the spectral intensity, the average spectral intensity, and the covariance information, a medium type determination unit that determines a type of the print medium from the plural reference printing media based on the Mahalanobis distances, and an image printing unit that performs the image processing in response to the determined reference printing medium on the image data and prints the image on the print medium.

Further, a printing method according to an aspect of the invention corresponding to the above-described printing apparatus includes an image processing memory step of storing image processing data that is for performing image processing on image data in response to predetermined plural types of reference printing media, a spectral intensity measurement step of measuring spectral intensity as light intensity at predetermined plural types of measurement wavelengths by applying light to a print medium before an image is printed thereon, an average spectral intensity memory step of storing average spectral intensity obtained by measuring the spectral intensity at plural times and obtaining average values of the spectral intensity with respect to each measurement wavelength with respect to the plural types of reference printing media, a covariance information memory step of storing covariance information obtained by measuring the spectral intensity at plural times and obtaining covariances of the spectral intensity among the plural measurement wavelengths with respect to the plural types of reference printing media, a Mahalanobis distance acquisition step of acquiring Mahalanobis distances between the print medium and the plural types of reference printing media based on the spectral intensity, the average spectral intensity, and the covariance information, a medium type determination step of determining a type of the print medium from the plural reference printing media based on the Mahalanobis distances, and an image printing step of performing the image processing in response to the determined reference printing medium on the image data and printing the image on the print medium.

In the printing apparatus and the printing method according to the aspects of the invention, the average spectral intensity and the covariance information are stored in advance with respect to the plural types of reference printing media. Here, the average spectral intensity is averaged spectral intensity obtained by measuring the spectral intensity as light intensity at the plural measurement wavelengths at plural times and averaging the light intensity of the spectral intensity at the respective measurement wavelengths with respect to each measurement wavelength. The spectral intensity with respect to the reference printing medium may be obtained by applying light to the reference printing medium and measuring the light intensity at the plural measurement wavelengths. The light intensity measured here may be intensity of reflected light from the reference printing medium or intensity of the light transmitted through the reference printing medium. Note that it is not necessary to use the value of the measured light intensity as it is and, for example, the measured light intensity may be converted into a value indicating a ratio to intensity of the applied light and used in place of the light intensity.

The covariance information is information obtained by measuring the spectral intensity at plural times and obtaining the covariance of the light intensity among plural measurement wavelengths. Furthermore, image processing data that is for performing image processing on the image data is stored in advance in response to the plural types of reference printing media. Then, when an image is printed, light is applied to the print medium before the image is printed thereon and the spectral intensity of the print medium is measured, and then, the Mahalanobis distances between the print medium and the respective reference printing media are acquired based on the average spectral intensity and the covariance information stored in advance. Then, the type of the print medium is determined from those reference printing media based on the Mahalanobis distances obtained between the respective reference printing media and itself. Then, the image processing in response to the determined reference printing medium is performed on the image data, and thereby, the image is printed on the print medium.

The spectral intensity measured with respect to the print medium has not only information on light intensity at the individual measurement wavelengths but also various information on relations among light intensity at the plural measurement wavelengths, e.g., the magnitude relations, and relations such that which and how much is larger. Further, using the Mahalanobis distances between the print medium and the respective reference printing media, the spectral intensity of the reference printing medium to which the spectral intensity of the print medium is close may be determined in consideration of variations of the light intensity at the individual measurement wavelengths and variations of the relations of the light intensity at the plural measurement wavelengths. Accordingly, the type of the print medium can be determined with high accuracy and the image can be appropriately printed on the print medium. Obviously, the same type of reference printing medium as the print medium may not exist in the plural types of reference printing media stored in advance. However, even in this case, the image processing in response to the reference printing medium nearest the print medium is performed, and the image can be appropriately printed on the print medium.

In the printing apparatus according to the aspect of the invention, the processing may be performed in the following manner. First, principal component analysis is performed on the spectral intensity and plural principal component values with respect to the predetermined plural principal components are extracted. Further, the plural principal component values of the average spectral intensity obtained with respect to the plural principal components are stored as average spectral intensity. Furthermore, the covariances between the plural principal component values of the spectral intensity obtained with respect to the plural principal components are stored as the covariance information. Then, after the spectral intensity with respect to the print medium is measured, the plural principal component values may be extracted from the obtained spectral intensity and the Mahalanobis distances with respect to the respective reference printing media may be calculated using the principal component values.

By performing the principal component analysis to extract the principal component values from the spectral intensity, the characteristics of the spectral intensity may be expressed using the principal component values with the smaller number than the number of the measurement wavelengths. Therefore, by calculating the Mahalanobis distances using the principal component values, the Mahalanobis distances may be calculated more rapidly than the calculation of the Mahalanobis distances using the spectral intensity. Further, the fact that the characteristics of the spectral intensity may be expressed using the smaller number of principal component values means that the noise is removed and the characteristics are emphasized. Therefore, by calculating the Mahalanobis distances using the principal component values, the type of print medium can be determined more stably without being affected by noise.

BRIEF DESCRIPTION OF THE DRAWINGS

The invention will be described with reference to the accompanying drawings, wherein like numbers reference like elements.

FIG. 2 is a sectional view showing a general structure of a printing medium discriminator mounted on the printing apparatus.

FIGS. 3A and 3B are perspective views showing an outer shape of a spectroscope mounted on the printing medium discriminator.

FIGS. 7A to 7E are explanatory diagrams of a covariance matrix obtained from measurement results of spectral reflectance at plural times.

FIG. 11A to 11E are explanatory diagrams of a Mahalanobis distance.

FIG. 12 is an explanatory diagram showing discrimination of the types of printing media based on the Mahalanobis distances.

FIG. 13 is an explanatory diagram showing storage of color conversion tables in response to the types of printing media.

FIG. 14 is an explanatory diagram showing development of the covariance matrix using plural eigenvalues and column vectors corresponding to the respective eigenvalues.

DESCRIPTION OF EXEMPLARY EMBODIMENTS

As below, embodiments will be explained in the following order for clarification of the invention.

A. Apparatus Configuration

A-1. Configuration of Printing Apparatus
A-2. Configuration of Spectroscope
B. Covariance Matrix
C. Printing Processing
D. Modified Example

A. Apparatus Configuration

A-1. Configuration of Printing Apparatus

Figure 1:
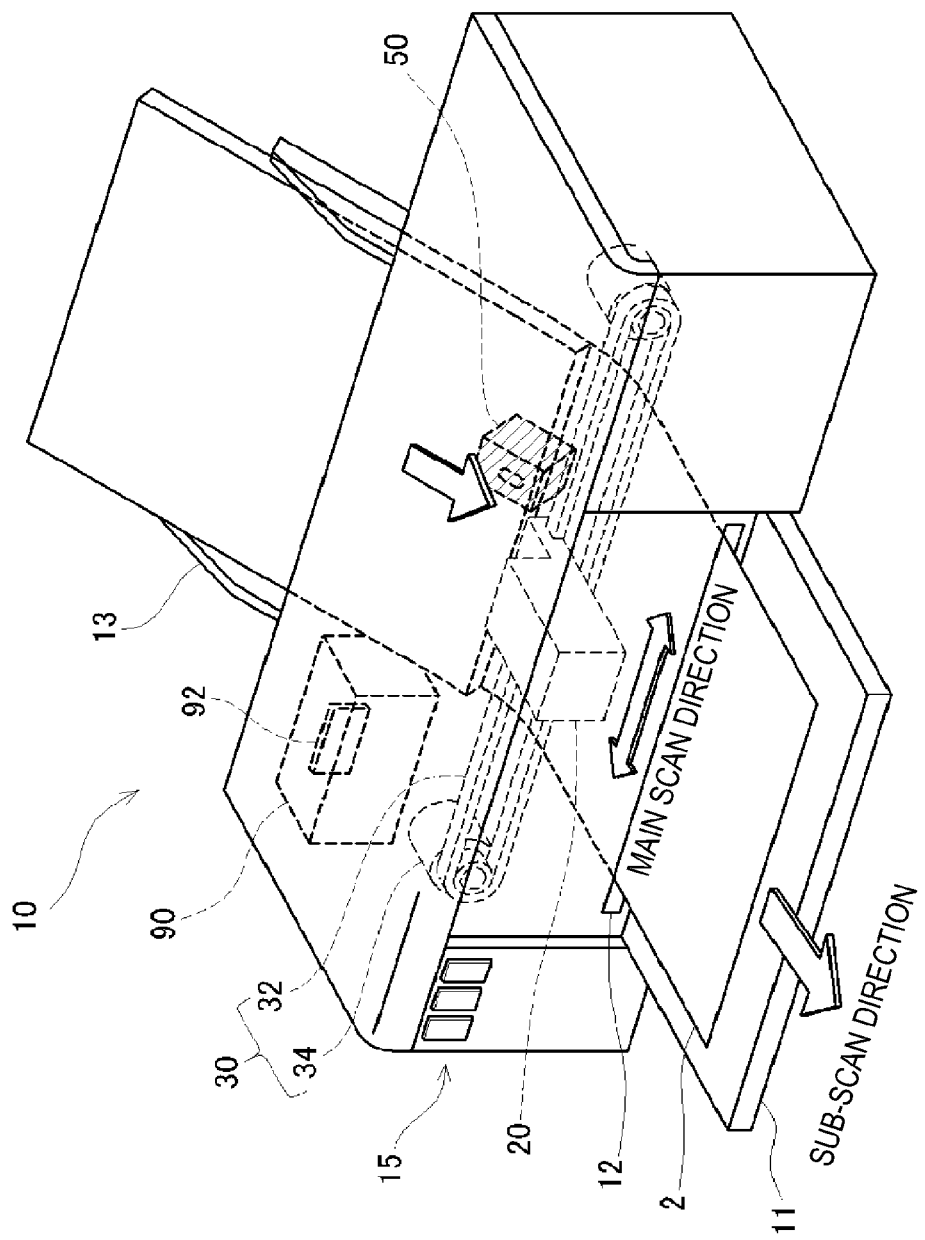
FIG. 1 is an explanatory diagram showing a general configuration of a printing apparatus of an embodiment.

FIG. 1 is an explanatory diagram showing a general configuration of a printing apparatus 10 of the embodiment. The printing apparatus 10 of the embodiment is the so-called inkjet printer of printing images by injecting inks on a surface of a printing medium 2. The printing apparatus 10 has an outer shape of a nearly box shape, and a front cover 11 is provided nearly at the center on the front face and plural operation buttons 15 are provided adjacent to the cover. The front cover 11 is pivotally supported at the lower end side and, when the upper end side is pulled open, an elongated eject opening 12 from which the printing medium 2 is ejected appears. Further, a paper feed tray 13 is provided at the rear side of the printing apparatus 10. When the printing medium 2 is set in the paper feed tray 13 and the operation button 15 is operated, the printing medium 2 is drawn from the paper feed tray 13, an image is printed on the surface of the printing medium 2 within the printing apparatus 10, and then, the medium is ejected from the eject opening 12.

Within the printing apparatus 10, an injection head 20 that injects inks on the printing medium 2 while reciprocating in the main scan direction, a drive mechanism 30 that reciprocates the injection head 20, etc. are mounted. On the bottom surface side (the side facing the printing medium 2) of the injection head 20, plural injection nozzles are provided and inks may be injected from the injection nozzles toward the printing medium 2. The drive mechanism 30 includes a timing belt 32 having plural teeth formed inside, a drive motor 34 for driving the timing belt 32, etc. The timing belt 32 is fixed to the injection head 20 at one point. Accordingly, when the timing belt 32 is driven, the injection head 20 reciprocates in the main scan direction while being guided by guide rails (not shown) extended in the main scan direction.

Further, within the printing apparatus 10, a carrying mechanism (not shown) for carrying the printing medium 2 in a direction (sub-scan direction) orthogonal to the main scan direction is mounted. In FIG. 1, the path in which the printing medium 2 is carried within the printing apparatus 10 is shown by a thick broken line. An image may be printed on the printing medium 2 by gradually moving the position of the printing medium 2 using the carrying mechanism while inks are injected with the injection head 20 reciprocated in the main scan direction. Within the printing apparatus 10, a control unit 90 that controls the operations of the injection head 20, the drive mechanism 30, and the carrying mechanism is also mounted. The control unit 90 performs predetermined image processing on image data of an image to be printed, and then, determines an amount of injection of inks based on the result. Then, the image is printed by controlling the injection head 20, the drive mechanism 30, and the carrying mechanism. Further, the control unit 90 includes a memory 92 that stores various programs for image processing data and various data.

Here, it is desirable to change the image processing to be performed on the image data depending on the type of the printing medium 2. As the simplest example, if the printing medium 2 is yellowish than usual, a yellowish image is obtained by usual printing. Accordingly, for printing the image with yellow suppressed than usual, it is desirable to change the image processing. Further, when the inks run on the surface of the printing medium 2, the injected inks may be mixed and the image quality may be deteriorated. Furthermore, when the printing medium 2 is swelled by the inks, wrinkles appear on the surface and causes deterioration of the image quality. The degree of running and the degree of swelling of the inks vary depending on the type of printing medium 2, and the problem is avoidable by changing the image processing in response to the type of printing medium 2.

Accordingly, in the printing apparatus 10 of the embodiment, a printing medium discriminator 50 is mounted on the location of the paper feed tray 13 where the printing medium 2 is set (below the set printing medium 2). In FIG. 1, the printing medium discriminator 50 is shown by hatched lines. The printing medium 2 set in the paper feed tray 13 is carried below the injection head 20 through above the printing medium discriminator 50. In this regard, the control unit 90 can discriminate the type of the printing medium 2 on which the image is to be printed using the printing medium discriminator 50. The printing medium 2 the type of which is discriminated using the printing medium discriminator 50 corresponds to "a print medium" according to the invention.

Note that, in the printing apparatus 10 of the embodiment, the printing medium discriminator 50 mounted below the printing medium 2 is explained, however, the printing medium discriminator 50 may be mounted above the printing medium 2. In the case where the printing medium discriminator 50 is mounted below the printing medium 2, when the printing medium discriminator 50 is mounted on the paper feed tray 13, the distance between the printing medium discriminator 50 and the printing medium 2 is constant independently of the number of printing media 2 set in the paper feed tray 13. Accordingly, when the printing medium 2 is set in the paper feed tray 13 (i.e., before the start of carrying the printing medium 2), the type of the printing medium 2 may be discriminated.

On the other hand, in the case where the printing medium discriminator 50 is mounted above the printing medium 2, when the printing medium discriminator 50 is mounted above the paper feed tray 13, the distance between the printing medium discriminator 50 and the printing medium 2 changes depending on the number of printing media 2 set in the paper feed tray 13, and stable discrimination of the type of the printing medium 2 becomes difficult. Accordingly, the printing medium discriminator 50 is mounted in the carrying path of the printing medium 2 from the paper feed tray 13, and the type of the printing medium 2 being carried is discriminated. In this case, the type of the printing medium 2 is discriminated after the start of carrying the printing medium 2, and thus, even with time constraints on the discrimination, there is an advantage that the type of the printing medium 2 may be discriminated by detecting the surface on which the image is printed (printing surface).

FIG. 2 is a sectional view showing a general structure of the printing medium discriminator 50 mounted on the printing apparatus 10 of the embodiment. As illustrated, the printing medium discriminator 50 includes a light source 52 that applies light to an object (here, the printing medium 2), a light receiving unit 54 that detects light intensity of the light reflected on the printing medium 2 (reflected light), a control unit 56 that controls the operations of the light source 52 and the light receiving unit 54, and a case 58 that contains them. Further, the light receiving unit 54 includes a lens system 54a that collects reflected light from the printing medium 2, a spectroscope 100 that spectroscopically separates the light collected by the lens system 54a, a lens system 54b that guides the light spectroscopically separated by the spectroscope 100 to a light sensor 54c.

The control unit 56 controls the light source 52 to apply light with predetermined intensity toward the printing medium 2. As the light source 52, a halogen lamp, an LED, or the like may be used, and it is desirable that the light source can generate light in a certain wavelength range (visible range, ultraviolet range, or the like). Further, the spectroscope 100 functions as the so-called bandpass filter of transmitting only the light in a specific narrow wavelength range. The wavelength of the light to be transmitted may be continuously changed or changed among plural wavelengths. As will be specifically explained later, in the embodiment, the extremely small spectroscope 100 using the so-called principle of Fabry-Perot interferometer is used.

The light sensor 54c generates a signal in response to the received light intensity like the so-called photodiode. The control unit 56 detects the signal from the light sensor 54c while changing the wavelength of the light to be transmitted by controlling the spectroscope 100, and thereby, detects the spectrum of the reflected light (light intensity data at the respective wavelengths). Further, if the spectrum of the light (the spectrum of irradiation light) applied to the printing medium 2 by the light source 52 is checked in advance, the spectral reflectance can be obtained by calculating the ratio of the spectrum of the reflected light to the spectrum of the irradiation light at the time.

A-2. Configuration of Spectroscope

FIGS. 3A and 3B are perspective views showing an outer shape of the spectroscope 100 used in the printing apparatus 10 of the embodiment. FIG. 3A shows the spectroscope 100 as seen from the side at which light enters, and FIG. 3B shows the spectroscope 100 as seen from the side at which light exits. Note that the arrows shown by dashed-dotted lines in the drawings indicate the direction of the light entering the spectroscope 100 and the direction of the light exiting from the spectroscope 100.

As shown in FIG. 3A, the spectroscope 100 includes a first substrate 110 and a second substrate 120 stacked thereon. The first substrate 110 and the second substrate 120 are formed using a silicon material (crystalline silicon or amorphous silicon) or a glass material. The thickness of the first substrate 110 is about 2000 μm at most (typically, 100 to 1000 μm), and the thickness of the second substrate 120 is about 500 μm at most (typically, 10 to 100 μm). Further, in the first substrate 110, an anti-reflection film 110AR is formed on the surface at the side at which light enters. Into the spectroscope 100, light enters from a part of the surface with the anti-reflection film 110AR formed thereon (the part surrounded by a thin broken line in the drawing). The anti-reflection film 110AR includes a dielectric multilayer film, and has a function of preventing reflection of the light entering the spectroscope 100.

As shown in FIG. 3B, an anti-reflection film 120AR is formed in a circular shape at the center on the surface (i.e., the second substrate 120) at the rear side (the side at which light exits) of the spectroscope 100. The anti-reflection film 120AR formed on the second substrate 120 also includes a dielectric multilayer film like the anti-reflection film 110AR of the first substrate 110. However, the anti-reflection film 120AR of the second substrate 120 has a function of preventing the light to exit from the spectroscope 100 to the outside from being reflected on the surface of the second substrate 120 or returned into the spectroscope 100. Further, in the second substrate 120, thin slits 120s are formed to surround the anti-reflection film 120AR, and the slits 120s penetrate the second substrate 120. Furthermore, lead holes 120a, 120b having nearly rectangular shapes are also formed in the second substrate 120.

Figure 4:
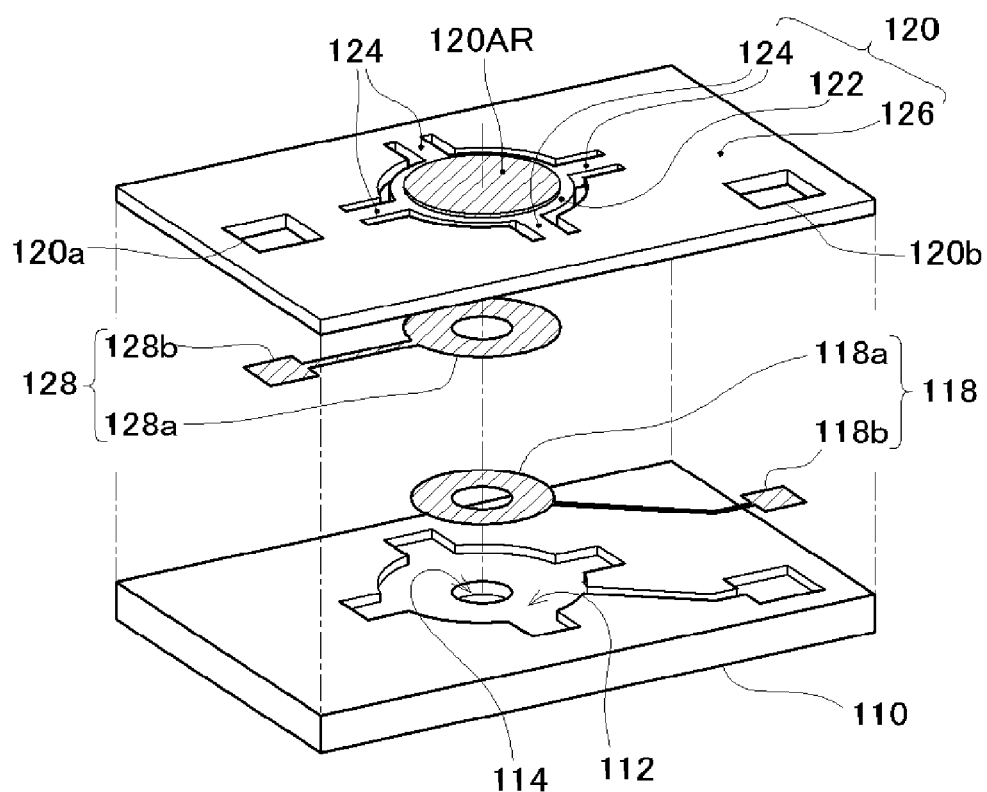
FIG. 4 is an exploded view of the spectroscope mounted on the printing medium discriminator.

FIG. 4 is an exploded view showing a structure of the spectroscope 100. Note that, as has been described above using FIGS. 3A and 3B, in the spectroscope 100, the surface at the light incident side (first substrate 110) is a simple flat surface, however, the inner side of the first substrate 110 (the side facing the second substrate 120) has a complex shape. Accordingly, for clearly showing the inner shape of the first substrate 110, FIG. 4 shows the exploded view in the state in which the spectroscope 100 is turned over (the state with the second substrate 120 on the first substrate 110 as shown in FIG. 3B).

As described above, in the second substrate 120, the slits 120s (see FIG. 3B) are formed to surround the anti-reflection film 120AR at the center, and the slits 120s penetrate the second substrate 120. As a result, as shown in FIG. 4, the second substrate 120 is divided into a center round movable part 122 (the part in which the anti-reflection film 120AR is formed), a peripheral part 126 outside of the movable part, and plural (four in the illustrated example) connection parts 124 connecting the movable part 122 and the peripheral part 126.

To the inner side (the side facing the first substrate 110) surface of the second substrate 120, a second electrode 128 is bonded. As shown in FIG. 4, the second electrode 128 includes a drive electrode part 128a having an annular shape and a lead electrode part 128b extending from the drive electrode part 128a, and is formed using a metal foil having a thickness of about 0.1 to 5 μm. The second electrode 128 is positioned with respect to the second substrate 120 so that the drive electrode part 128a having the annular shape may be concentric with the movable part 122 of the second substrate 120 and the end of the lead electrode part 128b may be located in the position of the lead hole 120a of the second substrate 120.

On the other hand, on the inner side (the side facing the second substrate 120) surface of the first substrate 110, a first recess part 112 is formed, and further, a circular second recess part 114 is formed at the center of the first recess part 112. Note that the region shown by the thin broken line in FIG. 3A (the region where light enters the spectroscope 100) corresponds to the part of the bottom of the second recess part 114. Further, the shape of the first recess part 112 roughly corresponds to the shapes of the movable part 122 and the connection parts 124 of the second substrate 120. Furthermore, the first recess part 112 is extended to a location corresponding to the lead hole 120b of the second substrate 120.

To the first recess part 112, a first electrode 118 is bonded. The first electrode 118 also includes a drive electrode part 118a having an annular shape and a lead electrode part 118b extending from the drive electrode part 118a, and is formed using a metal foil having a thickness of about 0.1 to 5 μm like the above-described second electrode 128. Further, the first electrode 118 is positioned so that the drive electrode part 118a having the annular shape may be concentric with the circular second recess part 114. The spectroscope 100 of the embodiment is formed by bonding of the above-described second substrate 120 and first substrate 110.

Figure 5:
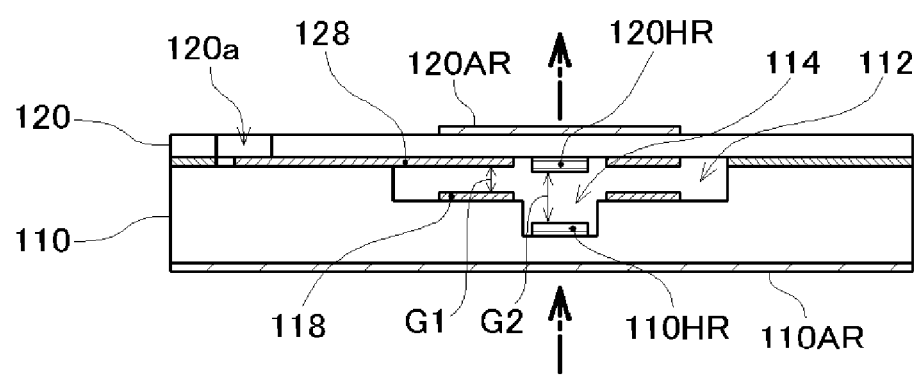
FIG. 5 is a sectional view showing an internal structure of the spectroscope mounted on the printing medium discriminator.

FIG. 5 is a sectional view showing an internal structure of the spectroscope 100 of the embodiment. The section location is the A-A location shown in FIG. 3B. As described above, the second electrode 128 is provided on the second substrate 120 and the first electrode 118 is provided within the first recess part 112 on the first substrate 110. Accordingly, a gap G1 nearly corresponding to the depth of the first recess part 112 is formed between the drive electrode part 128*a* of the second electrode 128 and the drive electrode part 118*a* of the first electrode 118.

Further, on a bottom surface of the second recess part 114 provided in the first substrate 110, a first reflection film 110HR of a dielectric multilayer film is formed. Furthermore, a second reflection film 120HR of a dielectric multilayer film is formed to face the first reflection film 110HR in the second substrate 120. Therefore, a gap G2 is also formed between the first reflection film 110HR and the second reflection film 120HR. The first reflection film 110HR and the second reflection film 120HR have functions of reflecting light with high reflectance. Accordingly, the light entering the spectroscope 100 as shown by the arrows of dashed dotted lines in the drawing is repeatedly reflected at many times between the second reflection film 120HR and the first reflection film 110HR, and the so-called Fabry-Perrot interferometer is formed. As a result, the lights having wavelengths that do not fulfill the interference condition determined by the distance of the gap G2 are rapidly attenuated on the surfaces of the first reflection film 110HR and the second reflection film 120HR due to the interference of lights, and only the lights having wavelengths that fulfill the interference condition are output from the spectroscope 100 to the outside.

Further, the distance of the gap G2 can be changed in the following manner. First, the drive electrode part 128*a* of the second electrode 128 is provided in the movable part 122 of the second substrate 120, and the lead electrode part 128*b* of the second electrode 128 can be accessed from the lead hole 120*a* formed in the second substrate 120. Furthermore, the drive electrode part 118*a* of the first electrode 118 is provided to face the drive electrode part 128*a* of the second electrode 128 on the first substrate 110, and the lead electrode part 118*b* of the first electrode 118 can be accessed from the lead hole 120*b* of the second substrate 120 (see FIG. 4). Accordingly, when the voltage with the same polarity is applied from the lead holes 120*a*, 120*b* to the second electrode 128 and the first electrode 118, the drive electrode part 128*a* of the second electrode 128 and the drive electrode part 118*a* of the first electrode 118 are charged with the same polarity, and repulsive forces to each other may be generated.

Further, since the movable part 122 of the second substrate 120 is only supported by the peripheral part 126 via the elongated connection parts 124, the connection parts 124 are deformed by the repulsive forces acting between the drive electrode part 128*a* of the second electrode 128 and the drive electrode part 118*a* of the first electrode 118 and the gap G1 becomes wider, and thus, the gap G2 also becomes wider. When the applied voltage is increased, the repulsive forces also increase, and the gap G2 becomes even wider. When the drive electrode part 128*a* of the second electrode 128 and the drive electrode part 118*a* of the first electrode 118 are charged with opposite polarities, attractive forces are generated, and thus, the gap G2 may be made narrower.

In this manner, in the spectroscope 100 of the embodiment, the distance of the gap G2 may be changed by applying the voltages from the lead holes 120*a*, 120*b* formed in the second substrate 120 to the second electrode 128 and the first electrode 118. As a result, the interference condition may be changed between the second reflection film 120HR and the first reflection film 110HR, and only the wavelength that fulfills the interference condition may be output from the spectroscope 100. The printing medium discriminator 50 shown in FIG. 2 detects the data (spectrum) of the light intensity at the respective wavelengths by detecting the intensity of the light output from the spectroscope 100 using the light sensor 54*c* in the above-described manner.

Figure 6:
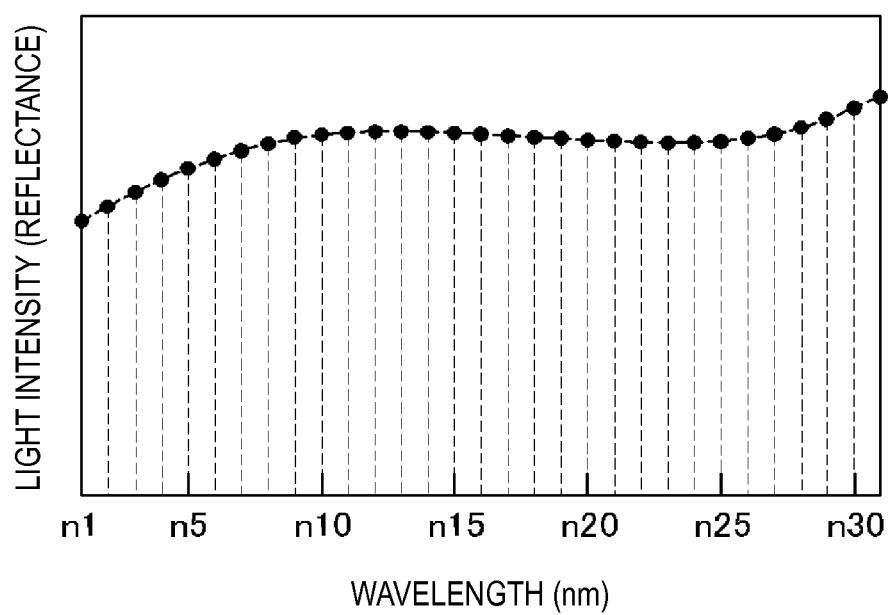
FIG. 6 is an explanatory diagram for exemplification of data of a spectrum obtained in the printing medium discriminator.

FIG. 6 exemplifies data of the spectrum obtained in the above-described manner. The illustrated example shows a result of measurement of light intensity at plural wavelengths at predetermined wavelength intervals (10 nm) in a certain wavelength range (400 nm to 700 nm). Further, the light intensity obtained at the respective wavelengths is divided by the intensity at the wavelengths contained in the irradiation light from the light source 52, and thereby, reflectance at the respective wavelengths (spectral reflectance) can be calculated. Note that, in the example shown in FIG. 6, the light intensity at 31 wavelengths are measured, however, the points of measurement may be less or more.

Further, while the numeric values of the light intensity change depending on the intensity of incident light, the reflectance takes values independent of the light source intensity or the light receiving element sensitivity and convenient. Accordingly, as below, the reflectance will be exclusively used. Note that the data of light intensity at the respective wavelengths (or reflectance data at the respective wavelengths) exemplified in FIG. 6 corresponds to "spectral intensity" according to the invention and the wavelength at which the light intensity or the reflectance is obtained corresponds to "measurement wavelength" according to the invention. Further, the printing medium discriminator 50 that measures the data of light intensity at the respective wavelengths (or reflectance data at the respective wavelengths) corresponds to "spectral intensity measurement unit" according to the invention.

The spectral reflectance as shown in FIG. 6 varies according to the types of printing media 2. Therefore, the types of printing media 2 can be discriminated by measuring the spectral reflectance with respect to the printing media 2 (before images are printed thereon) set in the paper feed tray 13 of the printing apparatus 10. In this regard, measurement values of light intensity vary. Further, even the same type of printing media 2, measurement values may vary depending on the difference in measurement position or the difference in production lot. Therefore, even in the case where the spectral reflectance is not completely the same, the printing media 2 should be determined to be of the same type. However, when the acceptable range is made wider, erroneous determination is easily made.

On this account, in the printing apparatus 10 of the embodiment, variations of measurement values obtained at different wavelengths are checked and a kind of statistic called Mahalanobis distance are calculated based on the results, and thereby, the types of printing media 2 can be discriminated with high accuracy. As below, a matrix (covariance matrix) showing relations of measurement values among different wavelengths will be explained, and then, processing of discriminating the types of printing media 2 using the Mahalanobis distances and printing images will be explained.

B. Covariance Matrix

FIGS. 7A to 7E are explanatory diagrams showing a method of obtaining a covariance matrix by repeated measurement of spectral reflectance with respect to a certain printing medium 2 at plural times. FIG. 7A shows a measurement result of spectral reflectance obtained with respect to a certain type of printing medium 2. In measurement, plural times (here, 50 times) of measurements were performed in different measurement positions and production lots of the printing medium 2. The white circles shown in FIG. 7A show average values of reflectance obtained at the respective wavelengths by the plural times of measurements. Further, the arrows extending from the white circles in the vertical directions show variations (variances) of the measurement values. Here, the average values and the variances shown in FIG. 7A are numeric values separately calculated at the respective wavelengths, and do not show the relations among the wavelengths. Anything more than that the reflectance varies to nearly the same extent at wavelength n5 and wavelength n9 is not known. However, by obtaining covariance, the relations among the respective wavelengths may be known.

FIGS. 7B and 7C exemplify distribution charts showing relations between the reflectance at wavelength n5 and the reflectance at wavelength n9 obtained at each of the measurements. AV5 in the chart indicates the average value of the reflectance at wavelength n5 and AV9 in the chart indicates the average value of the reflectance at wavelength n9. Further, the black arrows indicate variances of reflectance at the respective wavelengths. Both distribution charts in FIG. 7B and FIG. 7C show the same variance with respect to wavelength n5 alone and the same variance with respect to wavelength n9 alone. However, as clearly seen from the two distribution charts, the relations between measurement values obtained at the two wavelengths are largely different.

The distribution chart in FIG. 7B shows the tendency that, when the measurement values at wavelength n5 are larger than the average value AV5, the measurement values at wavelength n9 are smaller than the average value AV9, and conversely, when the measurement values at wavelength n5 are smaller, the measurement values at wavelength n9 are larger. On the other hand, the distribution chart in FIG. 7C does not show any tendency like that. The distribution situation between the two wavelengths may be expressed using an index called covariance.

FIG. 7D shows a calculation formula for obtaining the covariance s59 between wavelength n5 and wavelength n9. The n5, n9 in the formula is reflectance at wavelength n5 or wavelength n9 obtained at each of the measurements. Further, N in the formula is the number of times of measurements (here, 50 times). When the downward-sloping distribution is obtained as shown in FIG. 7B, the covariance takes a negative value and, when the upward-sloping distribution is obtained, the covariance takes a positive value. Further, as shown in FIG. 7C, as the distribution tendency diminishes, the covariance value becomes smaller. Therefore, by obtaining the covariance of the reflectance obtained at two wavelengths (here, wavelength n5 and wavelength n9), the distribution situation between the two wavelengths may be known. Conversely, as shown in FIG. 7A, only by simply obtaining the average values and the variances at the respective wavelengths, information on the distribution situation between the wavelengths shown in FIGS. 7B and 7C (i.e., information on the relations of reflectance between wavelengths) is discarded.

As above, the covariance s59 expressing the relation of reflectance between the wavelengths has been explained while attention is focused on wavelength n5 and wavelength n9. Obviously, the covariance may be considered with respect to all combinations of wavelengths. A covariance s12 may be obtained by focusing attention on wavelength n1 and wavelength n2, and a covariance s13 may be obtained by focusing attention on wavelength n1 and wavelength n3. In this manner, the covariance obtained with respect to all combinations of wavelengths expressed in a form of matrix is a matrix called "covariance matrix" shown in FIG. 7E. Note that the values of diagonal elements (s11, s22, etc.) are variances as clearly seen from the calculation formula of FIG. 7D. The s11 indicates the variance of the reflectance obtained at wavelength n1 and the s22 indicates the variance of the reflectance obtained at wavelength n2. Further, as clearly seen from the calculation formula for obtaining the covariance shown in FIG. 7D, relations of s12=s21, s13=s31, . . . hold. Therefore, the covariance matrix must be a symmetric matrix.

Figure 8:
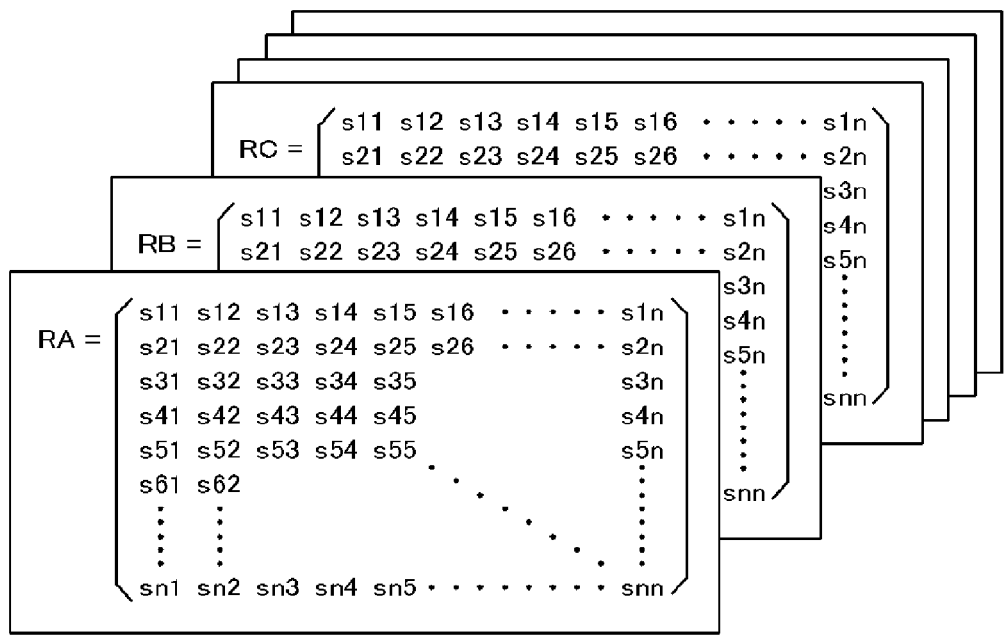
FIG. 8 is an explanatory diagram showing covariance matrices obtained with respect to plural types of printing media.

In the embodiment, the above-described covariance matrices are obtained with respect to commercially available 36 types of printing media 2 in advance. FIG. 8 exemplifies covariance matrices RA, RB, RC . . . obtained with respect to the respective printing media 2. In the memory 92 of the control unit 90 of the printing apparatus 10 of the embodiment, the covariance matrices with respect to the 36 types of samples are stored in advance. Further, the average values of the reflectance at the respective wavelengths (hereinafter, referred to as "average spectral reflectance") are obtained with respect to the respective printing media 2 in advance and stored in the memory 92 of the control unit 90. Furthermore, when images are printed, the spectral reflectance of the printing media 2 are detected using the printing medium discriminator 50 (see FIG. 1) and the types of printing media 2 are discriminated using the average spectral reflectance and the covariance matrices stored in the memory 92 of the control unit 90. In this manner, images can be appropriately printed in response to the types of printing media 2.

As below, printing processing performed in the printing apparatus 10 of the embodiment will be explained. Note that the plural types of printing media 2 having the average spectral reflectance and the covariance matrices stored correspond to "reference printing media" according to the invention. Further, the average spectral reflectance corresponds to "average spectral intensity" according to the invention, and the covariance matrix corresponds to "covariance information" according to the invention. Furthermore, the memory 92 of the control unit 90 that stores the average spectral reflectance and the covariance matrices corresponds to "average spectral intensity memory unit" and "covariance information memory unit".

C. Printing Processing

Figure 9:
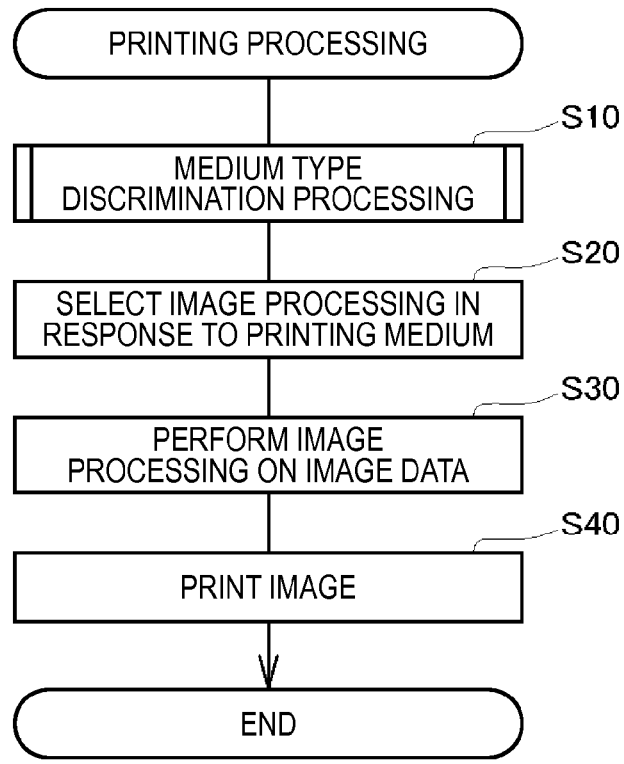
FIG. 9 is a flowchart of printing processing performed in the printing apparatus of the embodiment.

FIG. 9 is a flowchart of the printing processing performed in the printing apparatus 10 of the embodiment. This processing is executed by the control unit 90. In the printing processing, first, processing of discriminating the types of printing media 2 (medium type discrimination processing) is started using the printing medium discriminator 50 (step S10).

Figure 10:
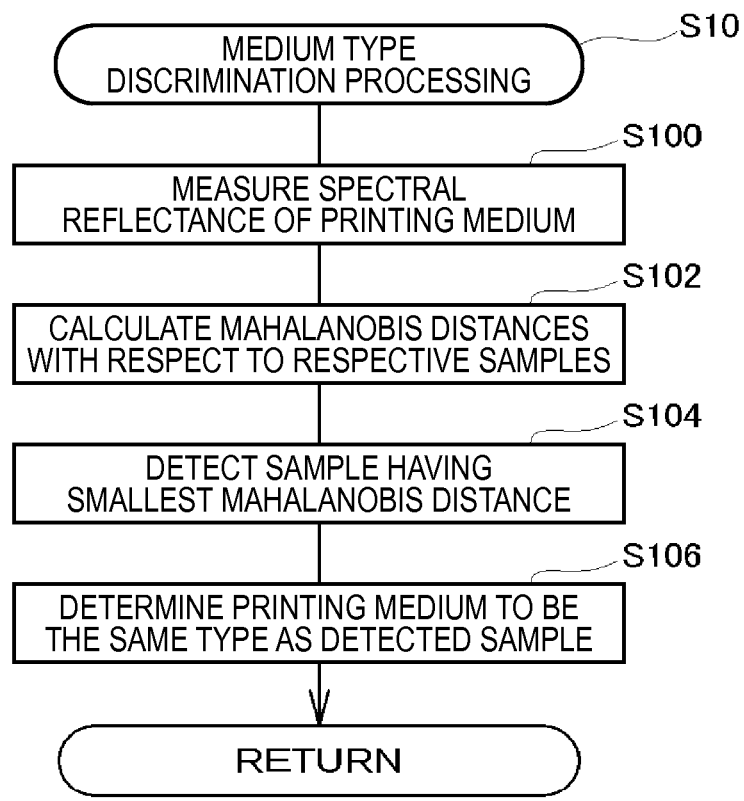
FIG. 10 is a flowchart of processing performed for discrimination of the types of printing media in the printing processing.

FIG. 10 shows a flowchart of the medium type discrimination processing. When the medium type discrimination processing is started, the spectral reflectance of the printing medium 2 is measured using the printing medium discriminator 50 (step S100). That is, as has been explained using FIG. 5, while the distance of the gap G2 is changed by changing the voltages applied to the first electrode 118 and the second electrode 128 of the spectroscope 100, the light intensity is detected by the light sensor 54c. As a result, the spectral reflectance as exemplified in FIG. 6 may be measured.

Subsequently, the Mahalanobis distances between the measured spectral reflectance and the respective samples are calculated (step S102). In the embodiment, the commercially available 36 types of printing media 2 are prepared as samples and the average spectral reflectance and the covariance matrices with respect to the respective samples are stored in advance, and thus, 36 Mahalanobis distances are calculated. Here, the Mahalanobis distance will be explained.

FIG. 11A to 11E are explanatory diagrams conceptually showing what is the Mahalanobis distance. When an average value "a" with respect to a certain group (here, Gr. A) and an average value "b" with respect to another group (here, Gr. B) are known and a measurement value x with respect to a new specimen is obtained, if the measurement value x is nearer the average value "a" than the average value "b" (if deviation is smaller) as shown in FIG. 11A, the specimen is normally considered to belong to the Gr. A. However, this holds on the assumption that variations of the measurement values are nearly equal between the Gr. A and the Gr. B. Therefore, in consideration of the variations of the measurement values of the Gr. A and the Gr. B, the conclusion may be opposite.

In the case exemplified in FIG. 11B, even if the measurement value x of the specimen is nearer the average value "a" than the average "b", the specimen is considered to belong to the Gr. B. That is, it is sure that the deviation between the measurement value x and the average value "a" is smaller than the deviation between the measurement value x and the average value b, however, the deviation between the measurement value x and the average value "a" is too large compared to the variations of the measurement values of the Gr. A for the consideration that the specimen belongs to the Gr. A. On the other hand, the deviation between the measurement value x and the average value "b" is smaller than the variations of the measurement values of the Gr. B, and the consideration that the specimen belongs to the Gr. B is rather natural.

As described above, by taking into account not only the deviations between the measurement values and the average values but also the ratios of the deviations to the variations (variance) of the measurement values, more correct determination may be made. The Mahalanobis distance is an index indicating to which group the specimen belongs by also taking the variations of the measurement values into consideration. The higher the probability that the specimen belongs to a certain group, the smaller the Mahalanobis distances with respect to the group.

As exemplified in FIG. 11B, when the measurement value x is one-dimensional, the deviation between the measurement value and the average value is squared and the value is divided by the variance, and thereby, the Mahalanobis distance (to be precise, the square value of the Mahalanobis distance) may be calculated. FIG. 11C shows a calculation formula for obtaining the Mahalanobis distance. Here, x in the formula is the measurement value, av is the average value, s is variance.

Further, the Mahalanobis distance may be extended to multidimension. As the simplest case, a two-dimensional Mahalanobis distance will be explained. In the case of the two dimensions, two measurement values of x1, x2 are obtained at each measurement. Furthermore, regarding the variance, not only the variance with respect to x1 and the variance with respect to x2 but also the covariance between x1 and x2 may be considered. Accordingly, a calculation formula for obtaining the two-dimensional Mahalanobis distance shown in FIG. 11D may be obtained by replacing the measurement value x of the calculation formula shown in FIG. 11C with a vector (x1,x2) and replacing the variance s with a covariance matrix. Note that av1, av2 in the formula are average values of x1, x2, respectively. Further, "−1" attached to as a superscript of the covariance matrix indicates an inverse matrix. Furthermore, "T" attached to the vector (x1,x2) indicates a transposed vector.

In the calculation formula shown in FIG. 11D, when the vector (x1-av1,x2-av2) is expressed by the capital "X" and the covariance matrix is expressed by the capital "R", the calculation formula of the two-dimensional Mahalanobis distance may be expressed by FIG. 11E. The calculation formula in FIG. 11E may be used as a multidimensional Mahalanobis distance calculation formula of the three or more dimensions as it is. That is, when the n-dimensional Mahalanobis distances are calculated, "X" is a vector having n elements and "R" is a covariance matrix of n rows and m columns.

As above, the Mahalanobis distance has been explained, and the spectral reflectance obtained at step S100 in FIG. 10 includes reflectance at n wavelengths, n-dimensional measurement values (see FIG. 6). Further, the covariance matrix obtained from the spectral reflectance is a matrix of n rows and n columns (see FIG. 7E). Furthermore, average spectral reflectance and covariance matrices with respect to plural samples are stored in advance in the memory 92 mounted on the control unit 90 of the printing apparatus 10.

In the medium type discrimination processing shown in FIG. 10, when the spectral reflectance of the printing medium 2 is measured (step S100), at the subsequent step S102, the Mahalanobis distances to the respective samples are calculated from the measured spectral reflectance using the calculation formula in FIG. 11E. Then, the sample having the smallest value of the Mahalanobis distance is detected (step S104), and the printing medium 2 is determined to be the same type as the sample (step S106). Note that, in the embodiment, the control unit 90 calculates the Mahalanobis distances to the respective samples, and the control unit 90 corresponds to "Mahalanobis distance acquisition unit" according to the invention.

FIG. 12 is an explanatory diagram showing results of discrimination of the types of printing media based on the Mahalanobis distances with respect to the plural printing media 2. Regarding the printing medium 2 of specimen 1, the Mahalanobis distances with respect to the respective samples are calculated such that the Mahalanobis distance with respect to sample A is "1", the Mahalanobis distance with respect to sample B is "24", the Mahalanobis distance with respect to sample C is "24", and the Mahalanobis distance with respect to sample D is "11". Therefore, specimen 1 is determined to be the same type as sample A having the smallest Mahalanobis distance. The types of printing media 2 may be discriminated in the same manner with respect to the other specimens.

From confirmation of various printing media 2, the types of printing media 2 can be discriminated with a probability of 100%. When the sample nearest the printing medium 2 is identified from the 36 commercially available samples, the medium type discrimination processing in FIG. 10 is ended and the process is returned to the printing processing in FIG. 9. Note that the control unit 90 performs the processing of specifying the types of printing media 2 based on the Mahalanobis distances, and the control unit 90 in the embodiment corresponds to "medium type determination unit" according to the invention.

As shown in FIG. 9, in the printing processing, the process is returned from the medium type discrimination processing (step S10), image processing is selected in response to the discriminated type of printing medium 2 (step S20). In the embodiment, image processing is selected by changing a color conversion table. Here, the color conversion table is a table referred to for determination of the density of inks injected to the printing medium 2 from image data. In the color conversion table, gray-level values of the image data and data indicating the density of the inks injected to the printing medium 2 are associated and stored.

As shown in FIG. 13, the color conversion tables are set with respect to each printing medium 2 in the memory 92 of the control unit 90 of the embodiment. In these color conversion tables, the density of inks for image data is set so that optimal images may be obtained in consideration of colors of the printing media 2, and the degree of running and the degree of swelling of the inks. Accordingly, at step S20, by selecting the color conversion table corresponding to the type of printing medium 2 discriminated by the above-described medium type discrimination processing, the image processing is selected. Note that the color conversion tables corresponding to the printing media 2 are stored in the memory 92 of the control unit 90, and the memory 92 of the control unit 90 in the embodiment corresponds to "image processing memory unit" according to the invention.

Then, the selected image processing is performed on the image data of the images to be printed (step S30). In the embodiment, processing of converting the image data into data indicating the density of inks with reference to the selected color conversion table, and then, determining the amount of injection and the time of injection of inks from the nozzles of the injection head 20 based on the obtained data is performed. Then, the image is printed on the printing medium 2 by actually injecting the inks while carrying the printing medium 2 little by little and performing main scan of the injection head 20 based on the processing result (step S40), and then, the printing processing in FIG. 9 is ended. Note that the control unit 90 performs processing of executing the selected image processing and printing the image on the printing medium 2, and the control unit 90 in the embodiment corresponds to "image printing unit" according to the invention.

As described above, in the printing apparatus 10 of the embodiment, the types of printing media 2 are discriminated prior to printing of images, and the images are printed in response to the discrimination results. Accordingly, even when the operator of the printing apparatus 10 does not set the types of printing media 2, the types of printing media 2 may be automatically discriminated and the images may be appropriately printed. Further, setting of carrying conditions (thickness, feeding speed, etc.) of the printing media 2, setting of drying conditions of the printing media 2, etc. can be automatically performed.

Further, when the types of printing media 2 are discriminated, the average spectral reflectance and the covariance matrices with respect to the plural samples are stored in advance, the Mahalanobis distances with respect to the respective samples are calculated, and thereby, the types of printing media 2 are discriminated. As has been described using FIGS. 7A to 7E, using the covariance, not only variations (variances) of the measurement values at the respective wavelengths but also relations among plural wavelengths (distribution situations or the like) may be considered. Therefore, by discriminating the types of printing media 2 based on the Mahalanobis distances calculated using the average spectral reflectance and the covariance matrices, the sample nearest the measured spectral reflectance may be selected in consideration not only of the reflectance at the respective wavelengths but also of the relations of the reflectance among the respective wavelengths.

Accordingly, the types of printing media 2 can be correctly discriminated with a high probability (a probability of 100% from the actually confirmed result). As a result, images are not printed with erroneous setting of the types of printing media 2 because the operator of the printing apparatus 10 makes wrong setting of the types of printing media 2 or forgets the setting and the previous setting remains, and the images can be always appropriately printed.

Obviously, the printing medium 2 the spectral reflectance of which has been measured may be another printing medium 2 (so-called unknown printing medium 2) than the types of printing media 2 with data stored as samples. In this case, the printing medium 2 is determined as the type of printing medium 2 different from that actual one. However, the determination that the printing medium is the same type of the sample having the smallest Mahalanobis distance is equal to the determination that the sample is the nearest the printing medium 2. Therefore, even with the unknown printing medium 2, the image processing considered to be most appropriate in the range that the printing apparatus 10 can perform is performed, and images can be appropriately printed thereon.

D. Modified Example

In the above-described embodiment, the Mahalanobis distances are calculated using the spectral reflectance measured by the printing medium discriminator 50 as it is. The spectral reflectance obtained by the printing medium discriminator 50 is reflectance at the plural (31 points in the example shown in FIG. 6) wavelengths and the Mahalanobis distances are calculated in multidimension (31 dimensions in the example shown in FIG. 6). The smaller the number of wavelengths for measurement, the faster the measurement and the faster the calculation of the Mahalanobis distances, however, when the number of wavelengths for measurement is reduced, deterioration in discrimination accuracy of printing media 2 is concerned. Accordingly, the Mahalanobis distances are not calculated using the spectral reflectance obtained by the printing medium discriminator 50 as it is, but the types of printing media 2 may be discriminated by reducing the number of dimensions of the spectral reflectance using principal component analysis and calculating the Mahalanobis distances in the reduced number of dimensions. As below, a modified example of the medium type discrimination processing will be explained.

First, a method of reducing the number of dimensions using the principal component analysis will be explained. Note that the principal component analysis itself is a known method, and only the outline thereof will be explained. To reduce the number of dimensions using the principal component analysis, it is necessary to obtain principal component vectors. The principal component vectors may be obtained by various methods, and here, a method using a covariance matrix will be explained. The covariance matrix is a symmetric matrix, and the plural eigenvectors are orthogonal and eigenvalues corresponding to the respective eigenvectors are real numbers. Further, the covariance matrix may be developed using these plural eigenvectors and the eigenvalues corresponding to the respective eigenvectors.

FIG. 14 shows development of the covariance matrix R using plural eigenvalues λ and column vectors corresponding to the respective eigenvalues λ. Note that $U_1$ in the formula is the first eigenvector and λ1 is the eigenvalue corresponding to $U_1$. Further, $U_2$ in the formula is the second eigenvector and λ2 is the eigenvalue corresponding to $U_2$. Subsequently, likewise, $U_n$ in the formula is the nth eigenvector and λn is the eigenvalue corresponding to $U_n$. The eigenvalues and the eigenvectors exist in the numbers corresponding to the number of dimensions of the covariance matrix R. The higher eigenvectors of the obtained eigenvectors are used as the principal component vectors, and thereby, only the number of dimensions may be reduced with little loss of the information of the spectral reflectance obtained by the printing medium discriminator 50.

Figure 15:
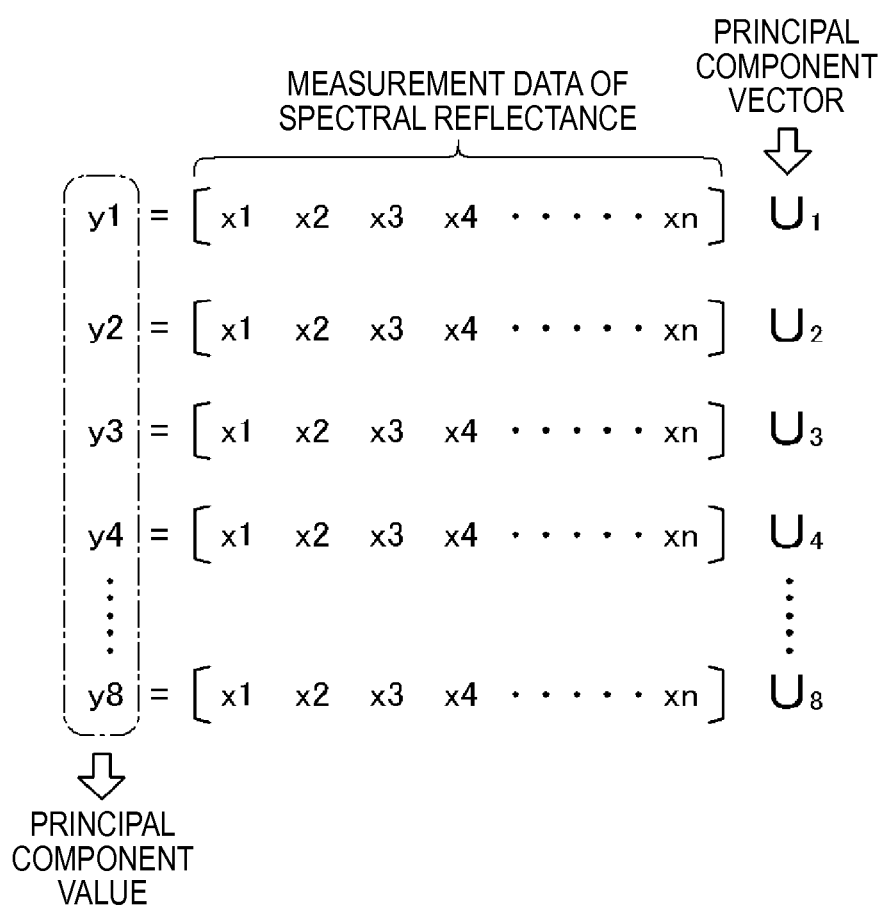
FIG. 15 is an explanatory diagram showing extraction of principal component values with respect to principal component vectors from measurement data of spectral reflectance.

FIG. 15 shows reduction of the number of dimensions of the spectral reflectance obtained by the printing medium discriminator 50 using the higher eigenvectors as the principal component vectors. In the illustrated example, the higher eight eigenvectors are used as the principal component vectors. Note that these principal component vectors are column vectors having the same number of dimensions as the number of dimensions of the spectral reflectance. Here, assuming that spectral reflectance data (x1, x2, . . . , xn) is obtained by the printing medium discriminator 50, 31-dimensional data is obtained in the example shown in FIG. 6. The inner product of the spectral reflectance data and the first principal component vector $U_1$ is obtained, and the obtained principal component value is y1.

Further, the inner product of the spectral reflectance data and the second principal component vector $U_2$ is obtained, and the obtained principal component value is y2. In this manner, the inner products with respect to the respective principal component vectors are obtained, and the principal component values y in the number corresponding to the number of principal component vectors (eight in the example shown in FIG. 15) may be obtained. That is, the number of dimensions of the spectral reflectance obtained by the printing medium discriminator 50 (31 dimensions in the case shown in FIG. 6) is reduced to the number of dimensions corresponding to the number of principal component vectors (eight dimensions in the example shown in FIG. 15). Note that, in the embodiment, the principal component vector corresponds to "principal component" according to the invention.

Further, it is known that, when the number of dimensions is reduced using the principal component vectors, the original information is lost little unlike the case where the number of dimensions is reduced by simply thinning the wavelengths for measurement of reflectance. Furthermore, the lower eigenvectors are not used as the principal component vectors, however, the principal component values corresponding to the lower principal component vectors are considered to be noise components. Therefore, by reducing the number of dimensions, the noise components can be removed. In the medium type discrimination processing of the modified example, the Mahalanobis distances are calculated using the principal component values y in place of the spectral reflectance, and the types of printing media 2 may be discriminated more reliably without the influence by the noise components.

Figure 16:
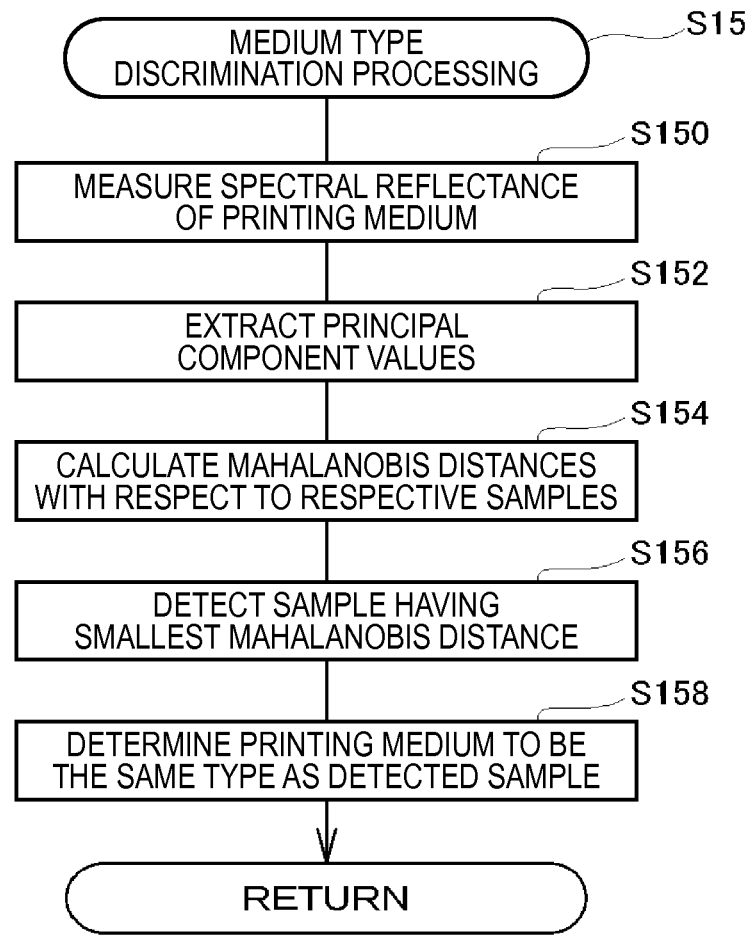
FIG. 16 is a flowchart of medium type discrimination processing of a modified example.

FIG. 16 is a flowchart of medium type discrimination processing of the modified example. This processing is executed in place of the medium type discrimination processing (step S10) in the printing processing shown in FIG. 9. Also, in the medium type discrimination processing of the modified example (step S15), when the processing is started, first, the spectral reflectance of the printing medium 2 is measured using the printing medium discriminator 50 (step S150). Subsequently, the inner products with respect to the plural principal component vectors obtained in advance are obtained, and the plural principal component values are extracted from the spectral reflectance (step S152). Note that the control unit 90 performs the processing of extracting the principal component values from the spectral reflectance and, in the embodiment, the control unit 90 corresponds to "principal component value extraction unit" according to the invention.

Then, the Mahalanobis distances with respect to the respective samples are calculated (step S154). In the above-described embodiment, the average reflectance and the covariance matrices at the respective wavelengths obtained by the printing medium discriminator 50 are obtained with respect to each sample, and the Mahalanobis distances with respect to the respective samples are calculated. On the other hand, in the modified example, the plural principal component values are used in place of the reflectance at the respective wavelengths. Accordingly, the average values and the covariance matrices with respect to the respective principal component values are obtained with respect to each sample and the Mahalanobis distances with respect to the respective samples are calculated using them.

Then, the sample having the smallest Mahalanobis distance of the respective samples is detected (step S156), and the type of printing medium 2 is determined to be the same type as the sample (step S158), and the medium type discrimination processing of the modified example shown in FIG. 16 is ended.

In the above-described medium type discrimination processing of the modified example, the number of dimensions for calculation of the Mahalanobis distances may be reduced, and the Mahalanobis distances may be rapidly calculated and the types of printing media 2 may be rapidly discriminated. Further, the principal component vectors, the average values of the principal component values, and the covariance matrices with respect to the principal component values may be obtained in advance, and the actual calculation is not complex. Obviously, new processing of calculating the principal component values with respect to each principal component vector from the spectral reflectance obtained by the printing medium discriminator 50 is necessary, however, the processing is only to obtain inner products between vectors and ends in an extremely short time. Therefore, the time taken for discrimination of the types of printing media 2 can be significantly reduced.

Further, when the spectral reflectance obtained by the printing medium discriminator 50 is converted into the principal component values in the smaller number of dimensions, the noise components are removed and the characteristics with respect to each of the types of printing media 2 becomes clearer. As a result, the types of printing media 2 can be discriminated more reliably in the medium type discrimination processing of the modified example.

As above, the printing apparatus 10 according to the invention has been explained using the embodiment and the modified example, and the invention is not limited to the embodiment and the modified example, but may be implemented in various forms without departing from the scope thereof.

In the above-described embodiment and modified example, the explanation has been made such that the spectral intensity is measured by applying the light from the light source 52 of the printing medium discriminator 50 and detecting the light intensity of the reflected light reflected on the printing medium 2. However, the spectral intensity may be measured by detecting the light intensity of the light transmitted through the printing medium 2, not the light intensity of the reflected light.

Furthermore, in the above-described embodiment and modified example, the explanation has been made such that the printing apparatus 10 is the so-called inkjet printer. However, the invention may be preferably applied to printing apparatuses of different systems such as a laser printer as long as the printing apparatuses print images by attaching color materials onto printing media 2.

The invention claimed is:

1. A printing apparatus that prints an image on a print medium by ejecting an ink, the printing apparatus comprising:
   a spectral intensity measurement unit that measures spectral intensities of the print medium at a plurality of wavelengths based on reflected or transmitted light from the print medium;
   a determination unit that determines which reference medium among reference print media most closely matches the print medium based on average spectral intensities and covariance information of the spectral intensities of the reference print media;
   a Mahalanobis distance acquisition unit that acquires Mahalanobis distances between the print medium and the reference print media based on the spectral intensities of the print medium, the average spectral intensities of the reference print media, and the covariance information of the spectral intensities of the reference print media; and
   a controller that controls
   an ejection amount of the ink based on a determination result of the determination unit.

2. The printing apparatus according to claim 1, further comprising
   a principal component value extraction unit that extracts a plurality of principal component values, the plurality of principal component values being obtained by performing principal component analysis on the spectral intensity,
   wherein the average spectral intensities are a plurality of average spectral intensity principal component values corresponding to the plurality of principal component values, and
   the covariance information is principal component covariance information data that is obtained based on the plurality of average spectral intensity principal component values.

3. The printing apparatus according to claim 1, wherein
   the covariance information is obtained by calculating a covariance of the average spectral intensities at the plurality of wavelengths.

4. The printing apparatus according to claim 1, wherein
   the spectra intensity measurement unit measures the spectral intensity of the print medium at five or more of the plurality of wavelengths.

5. A printing method of a printing apparatus that prints an image on a print medium by ejecting an ink, the method comprising:
   measuring spectral intensities of the print medium at a plurality of wavelengths based on reflected or transmitted light from the print medium;
   acquiring Mahalanobis distances between the print medium and reference print media based on the spectral intensities of the print medium, average spectral intensities of the reference print media, and covariance information of the spectral intensities of the reference print media;
   a first determining step of determining which reference print medium among the reference print media most closely matches the print medium based on the average spectral intensities and the covariance information of the spectral intensities of the reference print media; and
   a second determining step of determining an ejection amount of the ink for printing the image based on a result of the first determining.

6. The printing method according to claim 5, wherein
   the average spectral intensities are obtained by:
   applying light to the reference print media at a plurality of measurement wavelengths a plurality of different times;
   obtaining a reference spectral intensity for each of the plurality of measurement wavelengths at each of the plurality of different times; and
   calculating an average of the spectral intensities for each of the plurality of measurement wavelengths.

7. The printing method according to claim 5, wherein
   the measuring the spectral intensity of the print medium is performed at five or more of the plurality of wavelengths.

* * * * *